Sept. 20, 1949. J. P. JORDAN 2,482,545
HIGH-FREQUENCY HEATING APPARATUS
Filed July 24, 1945
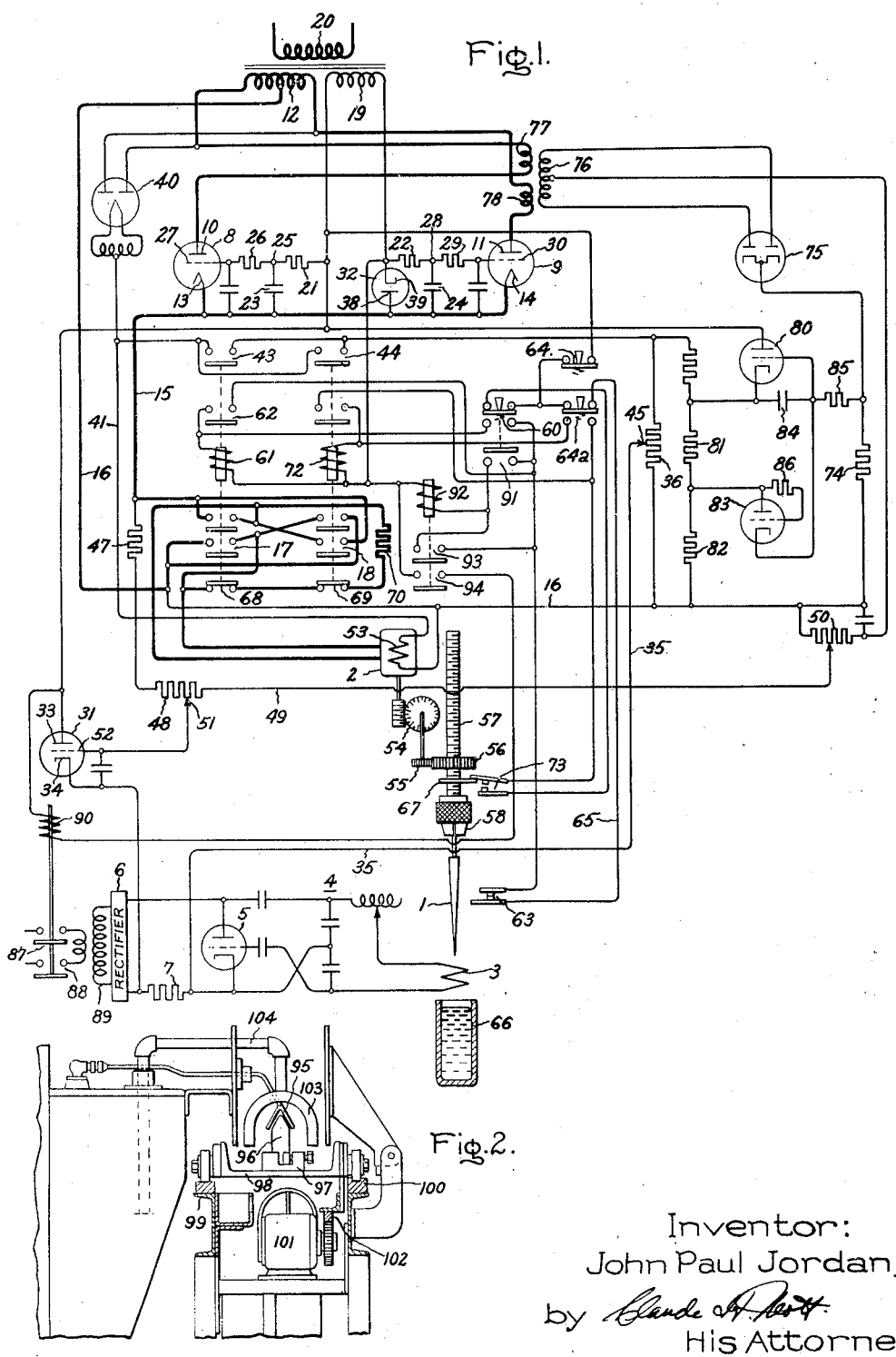
Inventor:
John Paul Jordan,
by Claude A. ......
His Attorney.

Patented Sept. 20, 1949

2,482,545

UNITED STATES PATENT OFFICE 2,482,545

HIGH-FREQUENCY HEATING APPARATUS

John Paul Jordan, Scotia, N. Y., assignor to General Electric Company, a corporation of New York Application July 24, 1945, Serial No. 606,821

11 Claims. (Cl. 219—47)

My invention relates to high frequency heating apparatus, more particularly to apparatus for the continuous heating of elongated work pieces made of magnetic material, and has for its object reliable and efficient means for feeding the work piece to the high frequency heating means at such a rate as to heat the work piece to a predetermined temperature irrespective of variations in cross-section of the work piece.

In carrying out my invention in one form, I provide a heating coil to which high frequency current is supplied, together with a motor for moving the article or work piece to be heated gradually into and through the coil, and means responsive to the current supplied to the heating coil for varying the rate of feed of the work piece so as to maintain the current substantially at a predetermined value. The amount of current supplied to the heating coil is dependent upon the amount of magnetic material in the coil. As the work piece is moved endwise through the coil from one end of the coil to the other, the work piece is heated to its decalescent temperature at which it becomes non-magnetic. When the work piece first enters the coil the current supplied to the coil increases, and decreases the speed of movement of the work piece. Thereafter when the first portion to enter the coil becomes non-magnetic, whereby its heating power input decreases suddenly to a relatively low value, the speed is increased somewhat. A stable speed condition is reached in which a predetermined amount of the metal in the coil is still magnetic. Changes in cross section of the work piece cause changes in the current supplied to the coil with resulting changes in the speed of the work piece, so that the work piece is heated substantially to the same final temperature.

For a more complete understanding of my invention, reference should be had to the accompanying drawing, Fig. 1 of which is a diagrammatic representation of high frequency heating apparatus embodying my invention, while Fig. 2 is a fragmentary view of a modified form of the movable support for the work piece.

Referring to the drawing, I have shown my invention in one form as applied to the heating of a work piece having a nonuniform cross section, as shown a tapered steel work piece such as a rat-tail file 1. The work piece is fed downward by suitable driving means operated by a motor 2 into a high frequency heating coil 3 whereby the work piece is moved into the high frequency heating field produced by the coil, the speed of the motor being automatically controlled in response to the current supplied to the coil.

High frequency electric current is supplied to the coil 3 by means of a suitable electronic oscillation generator 4 shown diagrammatically as a Colpitts type oscillation generator at a suitable frequency such as 530,000 cycles a second. This oscillation generator comprises a three-element electric discharge device, or valve 5, to which direct current is supplied from a suitable electronic rectifier 6.

In accordance with my invention, I provide a control resistance 7 in the direct current supply circuit, or anode circuit of the discharge device 5, together with control means responsive to the voltage across the resistor 7, and thereby responsive to the current supplied to the discharge device 5 and also to the current supplied to the heating coil, for automatically controlling the speed of the motor 2 so as to maintain a predetermined amount of magnetic material of the work piece 1 in the coil 3, i. e., in heating relation with the coil. For the control of the motor 2 I have shown electronic control means of the type described and claimed in U. S. Patent No. 2,312,117, issued on February 23, 1943, to Elmo E. Moyer, Orrin W. Livingston and Henry H. Leigh for Control system.

The armature of the motor 2 is supplied with electric current from suitable electric discharge valve means illustrated as a pair of thyratrons 8 and 9. The anodes 10 and 11 of these thyratrons are connected to opposite terminals of the supply transformer secondary winding 12, and the cathodes 13 and 14 are connected together to a conductor 15 which constitutes one side of the motor direct current supply source whose other side is a conductor 16 connected to a center tap on the secondary winding 12. These two supply mains 15 and 16 may be connected through reversing switches 17 and 18 to the armature of the motor 2. As thus connected, the thyratrons 8 and 9 rectify both half-waves of the alternating voltage and supply the rectified voltage to the motor.

The speed of the motor 2 is regulated by varying the average current supplied by the thyratrons. Although the thyratrons may be controlled by any suitable method, it is preferred to use the method of phase shift control of the grid voltage. For the carrying out of this method of control, a phase shifting resistance-reactance network is provided. This network comprises a second secondary winding 19 for the transformer having primary winding 20 supplied with a suitable alternating current, resistors 21 and 22, and capacitors 23 and 24. The resistors and capacitors are connected in series relationship across the secondary winding 19. The circuit is traced from the left-hand terminal of the secondary winding 19 through resistor 21, capacitor 23, the common cathode connection 15, capacitor 24, and resistor 22 to the opposite terminal of the secondary winding 19.

An electric connection is made from the common point 25 of resistor 21 and capacitor 23 through a resistor 26 to the grid 27 of thyratron 8. Similarly, the common point 28 between resistor 22 and capacitor 24 is connected through a resistor 29 to the grid 30 of thyratron 9. The capacitative reactance of the capacitors 23 and 24 is chosen relatively small in comparison with the resistance of resistors 21 and 22. Thus the alternating voltages across the capacitors 23 and 24 lag the voltage of the secondary winding 19 approximately 90 electrical degrees. Since the voltages across the capacitors 23 and 24 are applied to the grids 27 and 30, the voltages of grids 27 and 30 lag the voltages of the anodes 10 and 11, respectively, approximately 90 degrees.

The effect of phase shift of the grid voltage is produced by applying a variable component of direct voltage to the grids in addition to the 90-degree lagging alternating voltage component. This is accomplished by means of a pair of electric valves 31 and 32 connected in series relationship across the transformer secondary 19. The valve 31 is preferably a triode valve and the valve 32 is preferably a diode valve. The circuit is traced from the left hand terminal of the secondary winding 19 to the anode 33 of valve 31, cathode 34, resistance 7, conductor 35, a portion of potentiometer 36, main 16, reversing switch 17 or 18, armature of motor 1, reversing switch 17 or 18 to the common cathode connection main 15, anode 38 of valve 32, cathode 39 to the opposite terminal of the secondary winding 19. Thus, the triode valve 31 is in parallel circuit relationship with capacitor 23 and the diode valve 32 is in parallel circuit relationship with capacitor 24.

When the valves 31 and 32 are conducting, charges are placed on the capacitors 23 and 24, and as a result, a component of direct voltage is applied to the grids 27 and 30. The combination of this direct voltage component with the lagging alternating component produces the effect of phase shift of the grid voltage and corresponding variation of the average current transmitted by the thyratrons.

The amount of phase shift of the grid voltage of the thyratrons 8 and 9, and consequently the amount of current transmitted by the thyratrons can be varied by varying the relative conductivities of the triode valve 31 and the diode valve 32. This is accomplished simply by varying the conductivity of the valve 31. This control of the valve 31 is responsive to the voltage applied to the motor 2 in such manner as to maintain a constant predetermined voltage across the motor armature plus a small additional voltage to compensate for the resistance voltage drop in the motor armature. More particularly, the control of the valve 31 is effected by comparing the voltage actually supplied to the motor armature with a predetermined fixed voltage. The predetermined fixed voltage is supplied by a double diode electric valve 40 having its two anodes connected to opposite terminals of the secondary winding 12 and its cathode connected to a positive direct current supply main 41, the negative supply main for which is the supply conductor 16.

Across these supply mains 16 and 41 is connected the potentiometer 36 when the motor circuit is closed by switches 17 or 18, the lower end of the potentiometer 36 being connected directly to the supply main 16 while its upper end is connected to the supply main 41 by closure of one or the other of interlock switches 43 and 44 connected to the switches 17 and 18. A variable control voltage is obtained from the potentiometer 36 by means of the adjustable tap 45 which is connected through the conductor 35 and the resistor 7 to the cathode 34 of the valve 31. Thus, by suitable adjustment of the tap 45 on the potentiometer 36, the cathode 34 is maintained at a predetermined positive voltage with respect to the negative D. C. supply main 16 when the heating current in the resistor 7 is a predetermined value.

The voltage of the armature of motor 2 is impressed across a plurality of resistances in a circuit consisting of a resistance 47 connected to the main 15, a resistance 48, a conductor 49, and a portion of the resistance 50 connected to the supply main 16. By suitable adjustment of the tap 51 on the resistor 48 a desired portion of this armature voltage is supplied to the grid 52 of the valve 31. When the motor is started, its voltage is low and the grid 52 is less positive than the cathode 34 and, consequently, the valve 31 is shut off and does not carry current so that the valves 8 and 9 supply full current to the motor for rapid acceleration.

As the motor armature voltage increases, the grid 52 becomes more and more positive until finally the valve 31 conducts current, thereby decreasing the conductivity of the valves 8 and 9, and decreasing the current supplied to the motor. Finally, a condition of voltage balance is established between the grid 52 and the cathode 34 at which the motor runs at a predetermined speed. The separately exicted field winding 53 of the motor is connected directly across supply mains 16 and 41.

As shown, the motor 2 is connected to movable supporting or driving means for the file 1 including a worm gearing 54, gear 55, and a gear 56 having a threaded bore through which extends a threaded rod 57 having at its lower end a chuck 58 in which the small handle end of the file 1 is secured. The motor is started by depressing a suitable start button 60 whereby the coil 61 is energized for closure of the motor switch 17 and the interlock switch 43. Also an interlock switch 62 is closed for establishing and holding the circuit for the coil 61 through the limit switch 63. This supply circuit for the coil 61 leads from the lefthand side of the secondary winding 19 through the stop switch 64, switch 64a, the conductor 65, limit switch 63, switch 62 and the coil 61 back to the righthand side of the winding 19.

The motor turns in a direction to feed the file 1 endwise downward into and through the coil 3. When the cold end of the file enters the coil 3 it is, of course, magnetic and therefore a relatively large amount of power is supplied by the coil 3 to heat the metal with a correspondingly large current through the resistor 7. It is contemplated that the motor will reach a predetermined maximum speed by the time the end of the file 1 reaches a position with respect to the coil in which the heating of the file begins. As the file enters the coil, the increased voltage drop across resistor 7 produced by the increased current increases the positive voltage bias of the cathode 34, whereby the grid 52 is made relatively less positive with decreased current through the valve 31 and with retarded phase of the grid voltage of the valves 8 and 9, whereby the current supplied to the motor 2 is decreased with decrease in the speed of feed of the file. As the file is heated as it is fed into the coil 3, the end which enters the coil first is first heated to a decalescent temperature making it non-magnetic, with resulting decrease in the plate current through the resistor 7 whereby the speed of the motor is increased. A suitable condition of uniform speed of feed of the file is reached quickly with a predetermined current in the resistor 7, under which condition a certain amount of the metal in the coil is still in the magnetic state while the remainder is at a temperature above the decalescent point and, therefore, non-magnetic.

By suitably changing the position of the tap 45 on the potentiometer 36, the amount of magnetic material maintained in the heating coil 3 can be adjusted. An increase in resistance of the resistor 7 or movement of the tap 45 upward to include more of the voltage drop across the potentiometer 36 serves to make the cathode 34 more positive and, therefore, slow down the driving motor and decrease the predetermined current maintained in the resistor 7 and, therefore, decrease the amount of magnetic material in the coil. The reverse adjustment is also true. Therefore, it will be observed that the speed of the file 1 in the coil 3 is a function of the temperature to which the end of the file leaving the coil is heated.

As the larger upper portion of the file 1 is fed into the coil the plate current through the resistor 7 increases somewhat by reason of the increased amount of metal in the coil and, also, the closer coupling with the coil, thus decreasing the speed of the motor and the rate of feed of the file whereby the file is heated substantially to the same predetermined temperature.

As the heated lower end of the file emerges from the lower end of the coil 3 it enters a tank 66 containing suitable quenching fluid, such as water, whereby the file is quenched and the hardening operation completed.

When the file has been completely heated and quenched a projection 67 on the traveling rod 57 engages and opens the limit switch 63, whereby the circuit through coil 61 is opened thereby to open the motor circuit to stop the motor, and preferably the heating coil 3 is deenergized as described hereinafter. When the starting switch 17 opens it closes an interlock switch 68 connected in series with an interlock switch 69 on the switch 18 and a dynamic braking resistor 70 across the armature of the motor, whereby the motor is braked dynamically quickly to a stop. The motor can be reversed by depressing the start button 64a which energizes the operating coil 72 of the switch 18 through a limit switch 73 which is then closed. The motor then operates in a reverse direction, the coil 3 having been deenergized either manually or by the opening of the limit switch 63, as described hereinafter, to run the work piece to the raised position as shown in the drawing, at which time the limit switch is opened to stop the motor.

The potentiometer 50 is provided for the purpose of gradually increasing the voltage applied to the motor to compensate for the resistance voltage drop in the armature of the motor. This potentiometer 50 is supplied with current in series with a resistance 74 from a double full wave rectifier valve 75 having its anodes connected across the terminals of the secondary coil 76 whose primary coils 77 and 78 are current coils connected in circuit with the valves 8 and 9. Thus, the secondary 76 supplies a voltage proportional to the current supplied to the motor, which voltage is impressed upon the circuit including the resistances 50 and 74.

As the resistance drop in the motor armature increases, the motor current increases, thereby increasing the voltage drop across the potentiometer 50. This voltage drop, however, is in opposition to the motor armature voltage applied to the circuit containing the potentiometer 50 and the resistors 47 and 48. Consequently, the grid 52 is made less positive, whereupon the voltage applied to the motor is increased to offset the increase in voltage across the potentiometer 50.

The electric valve 80 is provided to limit the motor armature current to a predetermined maximum value. This valve 80 is connected in a control circuit substantially in parallel with the valve 31, this circuit leading from the lefthand side of the secondary 19 to which the anode of the valve is connected through the valve 80 and the resistances 81 and 82 to the negative direct current supply main 16. The grid of the valve 80 has applied to it the voltage across the resistor 74, which voltage, as previously explained, is responsive to the current of the motor armature. Ordinarily, the valve 80 is non-conducting because of the low voltage across the resistor 74.

In the event of an excessive motor current the voltage across the resistor 74 makes the grid of the valve 80 sufficiently positive to cause it to pass current with the result that the conductivity of the valves 8 and 9 is decreased independently of the valve 31 in the same manner as when the valve 31 passes current. In this way, the current supplied the motor is decreased until a voltage balance is established between the grid and cathode of the valve 80. When the motor runs under normal current operation, of course the valve 80 is rendered non-conducting and the control is taken over by the valve 31 again.

For the purpose of increasing the speed of response of the valve 80 to excessive currents, a three-element valve 83 is provided which has its anode circuit connected across the resistor 81 and the grid-cathode capacitor 84 of the valve 80. Also, a second resistor 85 is connected in circuit with the resistor 74 and the grid of the valve 80. The valve 83 operates as a rectifier to maintain a predetermined low voltage charge on the capacitor 84 depending upon the voltage across the resistor 81, such as a charge of a few volts. This charge is maintained regardless of the low voltage across the resistor 74 and therefore eliminates the time required to recharge the capacitor 84 for operation of the valve 80 in the event of a sudden increase in armature current. When the cathode voltage of the valve 83 exceeds its grid voltage supplied from its anode through a resistor 86, the valve 83 becomes non-conductive, this occurring before the valve 80 becomes conductive.

For the automatic control of the energization of the heating coil 3 along with the control of the motor 2, I have provided a switch 87 for controlling the supply of alternating current to a transformer winding 88 whose inductively related high voltage winding 89 applies a suitable alternating voltage to the rectifier 6. The switch 87 which is normally open is operated to its closed circuit position by a coil 90.

When the push button switch 60 is depressed to start the motor 2, a second switch 91 is closed at the same time for the energization of an operating coil 92 which closes two switches, a switch 93 establishing a holding circuit for the coil 92, and a switch 94 which closes a circuit connecting the coil 90 across the secondary winding 19, whereby the coil 90 is energized and the switch 87 closed. High frequency electric current is then applied to the coil 3.

It will be understood that the cathode of the discharge device 5 will preferably have been energized and heated by means, not shown, prior to the closing of the push button switch 91 so that high frequency current is applied immediately to the coil 3. In any case, the high frequency current is applied to the coil 3 by the time the lower end of the file 1 moves into inductive heating relation with the coil.

When the limit switch 63 is opened, as previously described, the coil 92 is deenergized because the coil 92 is connected, as shown in the drawing, across the secondary winding 19 through the limit switch 63, the coil 92 being in parallel with the coil 61. Therefore, when the limit switch 63 is opened the coil 92 is deenergized and the switches 93 and 94 open, the switch 94 deenergizing the coil 90 and the switch 87 thereupon opens to deenergize the heating coil 3.

As shown in Fig. 2, the part or work piece to be heated may be arranged and mounted for horizontal movement back and forth with relation to high frequency heating coil 95. The bar 96, whose upper beveled edge is to be heated, is secured in a clamping device 97 on a table 98 provided with rollers on opposite sides which run on tracks 99 and 100. The table 98 is driven back and forth by motor 101 connected to a rack 102 secured to the table. As the beveled edge of the bar 96 emerges from the heating coil 95, it is quenched by cooling water supplied from a spray quenching device 103 to which it is supplied under pressure through a pipe 104.

By reversing the connections with the terminals of the resistor 7 the motor will be controlled to correct for minor variations in the alternating current voltage applied to the generator 4. With the connections thus reversed an increase in the applied voltage increases the current in the resistor 7 with the result that the speed of the motor 2 is increased and feeds the work piece faster into the coil 3 thereby preventing the heating of the material to a temperature higher than the decalescent temperature. The power input to the work piece of course does increase in this case.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

What I claim as new and desire to secure by Letters Patent of the United States is:

1. High frequency electric induction heating apparatus for heating an elongated work piece made of magnetic material comprising a heating coil, connections for supplying high frequency current to said coil, driving means for feeding an elongated work piece into heating relation with said coil, and means responsive to the current supplied to said coil for controlling said driving means to vary the speed of said work piece in inverse relation with changes in said current so as to heat the work piece to a temperature at least as high as its decalescent temperature before it leaves said coil so that a part of the portion of the work piece in heating relation with said coil is nonmagetic.

2. High frequency electric induction heating apparatus for heating an elongated work piece made of magnetic material comprising a heating coil, generator means for supplying high frequency current to said coil, driving means for feeding an elongated work piece into heating relation with said coil, an electric motor for operating said driving means, and means responsive to the current supplied to said coil for varying the speed of said motor in inverse relation with changes in said current so as to heat the work piece to a predetermined temperature at least as high as its decalescent temperature before it leaves said coil so that a part of the portion of the work piece in heating relation with said coil is nonmagnetic.

3. High frequency electric induction heating apparatus for heating an elongated work piece made of magnetic material comprising a heating coil, connections for supplying high frequency current to said coil, driving means for feeding an elongated work piece into said coil, an electric motor for operating said driving means, and means responsive to the current supplied to said coil for varying the speed of said motor in inverse relation with changes in said current so as to heat the work piece to a predetermined temperature at least as high as its decalescent temperature before it leaves said coil so that a part of the portion of the work piece in said coil is nonmagnetic, and limit switch means operated by said driving means for deenergizing said motor and said coil.

4. High frequency induction heating apparatus for heating an elongated work piece made of a material having a relatively high heating power input at temperatures below a predetermined high temperature and a relatively low heating power input at temperatures above said predetermined temperature comprising high frequency heating means for producing an electric heating field, means for supplying high frequency current to said heating means, driving means connected to said work piece for moving said work piece continuously along a predetermined path through said heating field, and means responsive to the current supplied to said heating means for controlling the speed of said driving means so as to maintain said current substantially at a predetermined value at which said work piece is heated to a temperature at least as high as said predetermined temperature before it leaves said heating field so that a part of the portion of said work piece in said field has a relatively low heating power input.

5. High frequency induction heating means for continuously heating a material the power input to which decreases to a relatively low value at a predetermined temperature comprising high frequency heating means for producing a heating field, movable supporting means for the material to be heated, driving means connected to said supporting means to operate said supporting means and move continuously the material to be heated through said field, high frequency generator means for supplying a high frequency current to said heating means of such value as to heat the material to said predetermined temperature before it leaves said field so that a part of the material in said field at any time has a relatively low power input and variations in the speed of said material change the amount of relatively high power input material in said field thereby changing said current in direct relation to the change in speed, and means responsive to a change in said current for varying the speed of said driving means in inverse relation with the change in current so as to maintain said current substantially at said predetermined value.

6. High frequency induction heating means for continuously heating a magnetic material to a temperature at least as high as its decalescent temperature comprising high frequency heating means for producing a heating field, movable supporting means for the material to be heated, driving means connected to said supporting means to operate said supporting means and move continuously the material to be heated through said field, high frequency generator means for supplying a high frequency current to said heating means of such value as to heat the material to a temperature making it nonmagnetic before it leaves said field so that a part of the material in said field at any time is nonmagnetic and variations in the speed of said material change the amount of magnetic material in said field thereby changing said current in direct relation to the change in speed, and means responsive to a change in said current for varying the speed of said driving means in inverse relation with the change in current so as to maintain said current substantially at said predetermined value.

7. High frequency induction heating apparatus for heating an elongated work piece made of magnetic material comprising high frequency heating means for producing a heating field, means for supplying high frequency current to said heating means, driving means connected to said work piece for moving said work piece continuously along a predetermined path through said heating field at a speed such that the work piece is heated to its decalescent temperature making it non-magnetic before it passes completely through said heating field, and means responsive to the current supplied to said heating means for controlling the speed of said driving means so as to maintain said current substantially constant and thereby maintain in said field a predetermined amount of magnetic material of the work piece with the remainder of the portion of the work piece in said field heated to a temperature making it non-magnetic.

8. High frequency induction heating means for continuously heating an elongated work piece made of magnetic material comprising a heating coil for producing a heating field, movable supporting means for the work piece, driving means connected to said supporting means to operate said supporting means and move continuously the material to be heated through said field, high frequency generator means for supplying a high frequency current to said coil of such value as to heat the work piece to a temperature making it non-magnetic before it leaves said field so that a part of the portion of the work piece in said field at any time is non-magnetic and variations in the speed of said work piece change the amount of the magnetic part of said work piece in said field thereby changing said current in direct relation to the change in speed, and means responsive to a change in said current for varying the speed of said driving means in inverse relation with the change in current so as to maintain said current substantially at said predetermined value.

9. High frequency heating apparatus for heating elongated work pieces made of magnetic material comprising an induction heating coil, electronic generator means for supplying a high frequency current to said coil, means for feeding an elongated work piece into said coil, an electric motor for operating said feeding means, a resistance connected in a circuit of said generator such that the current in said resistance varies with the current in said coil, an electric discharge means connected to said resistance and the armature of said motor so as to be differentially responsive to the armature voltage of said motor and the voltage across said resistance, and means controlled by said electric discharge means for varying the current supplied to the armature of said motor in inverse relation to the voltage across said resistance so as to feed the work piece into said coil at a speed such that a part of the portion of the work piece in said coil is heated to a temperature making it nonmagnetic.

10. High frequency induction heating apparatus for heating an elongated work piece of nonuniform cross section comprising high frequency heating means for producing a heating field, connections for supplying high frequency current to said heating means, driving means for moving the work piece through said heating field, and means responsive to the current supplied to said heating means for controlling said driving means to vary the speed of said work piece in inverse relation with changes in said current so as to maintain said current substantially constant.

11. High frequency induction heating apparatus for heating an elongated work piece of nonuniform cross section made of magnetic material comprising high frequency heating means for producing a heating field, connections for supplying high frequency current to said heating means, driving means for moving the work piece through said heating field, and means responsive to the current supplied to said heating means for controlling said driving means to vary the speed of said work piece in inverse relation with changes in said current so as to maintain said current substantially constant and thereby maintain in said heating field a predetermined amount of magnetic material of the work piece.

JOHN PAUL JORDAN.

REFERENCES CITED

The following references are of record in the file of this patent:

UNITED STATES PATENTS

| Number | Name | Date |
|---|---|---|
| 1,321,504 | Bishop | Nov. 11, 1919 |
| 1,412,484 | Mordey | Apr. 11, 1922 |
| 1,646,498 | Seede | Oct. 25, 1927 |
| 1,687,656 | Brown | Oct. 16, 1928 |
| 1,747,934 | Heidenhain | Feb. 18, 1930 |
| 1,779,604 | Knerr | Oct. 28, 1930 |
| 1,808,241 | Martin | June 2, 1931 |
| 1,937,420 | Wood et al. | Nov. 28, 1933 |
| 2,041,029 | Stargardter | May 19, 1936 |
| 2,251,277 | Hart et al. | Aug. 5, 1941 |
| 2,312,117 | Moyer et al. | Feb. 23, 1943 |
| 2,324,068 | Crandell | July 13, 1943 |
| 2,329,188 | Denneen et al. | Sept. 14, 1943 |
| 2,371,459 | Mittelmann | Mar. 13, 1945 |
| 2,391,086 | Crandell | Dec. 18, 1945 |

OTHER REFERENCES

Mittelmann, "Load Rematching in Electronic Heating," Electronics, February 1945, pages 110–115 (particularly pages 114 and 115).